United States Patent

Engel et al.

[15] 3,643,011

[45] Feb. 15, 1972

[54] LUMINANCE SIGNAL CHANNEL

[72] Inventors: Christopher M. Engel, Franklin Park; Charles F. Hepner, Chicago, both of Ill.

[73] Assignee: Zenith Radio Corporation, Chicago, Ill.

[22] Filed: Apr. 16, 1970

[21] Appl. No.: 29,220

[52] U.S. Cl. ..................178/5.4 R, 178/7.5 R, 178/DIG. 25, 178/DIG. 34

[51] Int. Cl.........................................H04n 9/12, H04n 5/14

[58] Field of Search............178/7.3 R, 7.5 R, 5.4 R, DIG. 25, 178/DIG. 34

[56] References Cited

UNITED STATES PATENTS

| | | | |
|---|---|---|---|
| 3,377,425 | 4/1968 | Buzan | 178/DIG. 25 |
| 3,536,826 | 10/1970 | McMann, Jr. | 178/DIG. 25 |
| 3,461,234 | 8/1969 | Slusarski et al. | 178/7.5 |
| 3,535,443 | 10/1970 | Rieke | 178/DIG. 34 |

*Primary Examiner*—Robert L. Griffin
*Assistant Examiner*—Peter M. Pecori
*Attorney*—Francis W. Crotty and Cornelius J. O'Connor

[57] ABSTRACT

A video signal translating channel for a television receiver having a detector for developing a video signal has a first signal translating path coupled to the output of the detector. A differentiating network is included in the first signal path for developing a modified version of the detected video signal in which the high-frequency components are accentuated. A second signal translating path is also coupled to the output of the detector and it includes an integrating network for developing a differently modified version of the detected video signal in which the high-frequency components are attenuated. Phase inversion means are provided for inverting one of the modified signals relative to the other. Finally, matrix means, including an adjustable control circuit coupled to both of the signal paths, is provided for combining selectable portions of the phase inverted signal and the other of the modified signals to produce a resultant video signal having an altered high-frequency response and delayed in time relative to the detected signal.

12 Claims, 6 Drawing Figures

Inventors
Christopher M. Engel
Charles F. Hepner
By [signature]
Attorney

Inventors
Christopher M. Engel
Charles F. Hepner
By [signature]
Attorney

LUMINANCE SIGNAL CHANNEL

BACKGROUND OF THE INVENTION

This invention relates in general to signal translating circuits and in particular to a video signal translating channel for a television receiver.

It is a known practice to provide a television receiver with a control which permits the viewer to adjust, in accordance with his own tastes, the definition or "crispness" of the received picture. To enhance definition it is necessary to effect two opposite, but sequential changes in video signal level or drive. For example, to sharpen the transition when scanning from a "light" area to a "dark" area in a reconstituted image, it is common practice to utilize preshoot and overshoot circuitry to alter the high frequency response of the video drive signal prior to its application to a control electrode of the cathode-ray tube. The preshoot circuit alters video drive so that "lighter-than-light" picture elements are produced, which are immediately followed by "darker-than-dark" picture elements in response to the drive afforded by the overshoot circuit. In this fashion a crispened or sharply defined transition is produced.

In like manner when scanning from a "dark" to a "light" scene crispened transition obtains by virtue of the fact that preshoot now produces "darker-than-dark" picture elements which are immediately followed by "lighter-than-light" elements provided by overshoot. Preshoot is generally obtained by altering the phase characteristic of the video delay line. Preshoot is thus a designed-in factor with no provision for adjustment by the viewer.

Overshoot circuits, on the other hand, generally comprise an inductor or peaking coil, and a resistor network in which the latter usually is the adjustable component. An obvious shortcoming of prior art inductive type peaking controls resides in the fact that inductive elements are not amenable to microelectronic fabrication, i.e., integrated circuits.

While the foregoing observations relative to altering video response apply to color television as well as monochrome receivers, color receivers pose still another problem, insofar as video signal circuits are concerned. Specifically, in a color receiver the brightness content of the video signal is conveyed by a luminance channel, while the color or chroma information is processed in a chrominance channel. Furthermore, since the bandwidth of the luminance channel is significantly greater than the bandwidth of the chrominance channel, the signals translated through the chrominance channel are subjected to a greater time delay than signals translated through the luminance channel. Accordingly, to insure that the luminance and chrominance signals arrive at the picture tube in time coincidence, it is the practice to include a video delay in the luminance channel.

In addition to being a relatively costly component, a delay line must be properly terminated, at both input and output terminals, in order to effect a proper impedance match in the luminance channel. Moreover, since the conventional delay line employed in a color receiver takes the form of a multiturn coil which commonly introduces a delay of approximately 800 to 1,000 nanoseconds, it also is a component that is not readily adaptable to microelectronic circuit fabrication.

SUMMARY OF THE INVENTION

It is therefore an object of the invention to provide an improved video signal translating channel for a television receiver.

It is another object of the invention to provide a video signal translating circuit which permits greater flexibility in altering the frequency response of the video signal.

It is a specific object of the invention to provide a luminance signal translating circuit capable of permitting elimination of the luminance channel delay line employed in color television receivers.

It is also a specific object of the invention to provide a video signal translating circuit which, while permitting adjustable high frequency response, is readily amenable to microelectronic circuit fabrication.

It is a further object of the invention to provide a video signal translating channel which effects significant economies in color television receiver circuit design.

In accordance with one embodiment of the invention, a video signal translating channel for a television receiver having a detector for developing a video signal comprises a first signal translating path coupled to the output of the detector. This path includes a differentiating network for developing a modified version of the detected video signal in which the high frequency components are accentuated. A second signal translating path is also coupled to the output of the detector and it includes an integrating network for developing a differently modified version of the detected video signal in which the high frequency components are attenuated. Means are provided for phase inverting one of the modified signals relative to the other and finally, matrix means, including an adjustable control circuit coupled to both of the signal translating paths, is provided for combining selectable portions of the phase inverted signal and the other of the modified signals to produce a resultant video signal having an altered high frequency response.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGS. 3*a*, 3*b*, and 3*c* are a series of waveforms depicting overall IF response and overall chroma signal response in the color receiver of FIG. 1.

DESCRIPTION OF A PREFERRED EMBODIMENT

Figure 1:
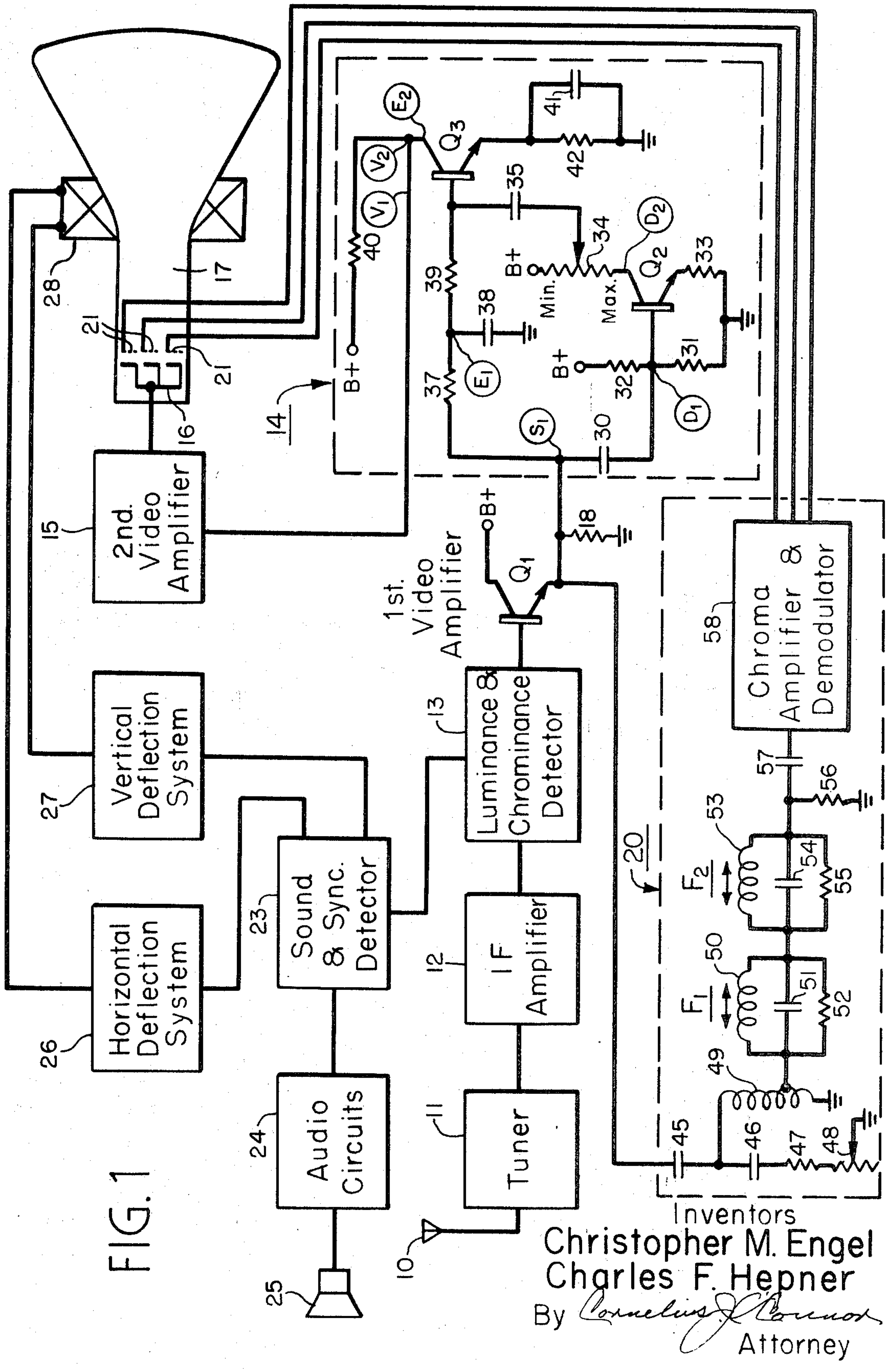
FIG. 1 is a schematic illustration of a television receiver employing a luminance signal translating channel constructed in accordance with a preferred embodiment of the invention.

Referring now to FIG. 1, with the exception of certain circuitry in the luminance and chrominance channels which will subsequently be described, the television receiver shown in FIG. 1 is essentially conventional in design and therefore only a brief description of its structure and operation is deemed necessary. A telecast signal intercepted by antenna 10 is coupled in a conventional manner to a tuner 11, which includes the usual radio frequency amplifying and heterodyning stages for developing an intermediate frequency (IF) signal. After amplification by IF amplifier 12 the signal is applied to a luminance and chrominance detector 13, wherein luminance and chrominance information, in the form of a composite video signal, is derived and applied to a first video amplifier $Q_1$ arranged as an emitter follower. The luminance component of the composite signal, which is developed across emitter resistor 18, is coupled to a video signal translating channel 14 wherein it is modified, in a manner detailed below, so that the high frequency content is altered and a finite time delay is introduced. This modified luminance signal is then amplified in a second video amplifier 15 and thereafter applied to assigned control electrodes of a three-gun color image reproducing cathode-ray tube 17, for example, the cathodes 16. While the invention, as disclosed, is embodied in a color television receiver, it also has a particularly attractive application in monochrome receivers which will be apparent when the operation of channel 14 is explained.

The chrominance components of the composite output signal of detector 13 are processed by a chrominance channel 20 which develops three color difference signals for application to assigned ones of control grids 21 included in the electron beam guns of cathode-ray tube 17. Conversely, of course, the chrominance components can be applied to cathodes 16 and the luminance signal to grids 21. It is also appreciated that the luminance and chrominance components can be externally matrixed to derive a color control signal for direct application to selected control electrodes of tube 17.

The output of IF amplifier 12 is also coupled, via detector 13, to a sound and sync detector 23 which derives sound and synchronizing components. The sound components are applied to audio circuits 24 wherein the audio content of the received signal is recovered and employed to drive a speaker 25. Synchronizing information, in the form of horizontal and vertical sync pulses, is applied to the horizontal and vertical deflection systems 26, 27, respectively, which generate sawtooth scanning signals for driving the deflection yoke 28 mounted upon the neck portion of cathode-ray tube 17. Since the electron beams are simultaneously modulated by the luminance information applied to cathodes 16 and by the chrominance information coupled to grids 21, the deflection of these beams by the horizontal and vertical deflection systems serves to reproduce a color image upon the viewing screen of cathode-ray tube 17.

Referring now with more particularity to the luminance signal translating channel 14, this stage is seen to comprise a first signal translating path which is coupled to the output of detector 13 and includes a differentiating network formed by a capacitor 30 and a resistor 31 serially connected between the emitter of video amplifier $Q_1$ and a plane of reference potential. The juncture of capacitor 30 and resistor 31 is connected to the base of a transistor $Q_2$ and to a source of positive biasing potential B+ via a resistor 32. The emitter of transistor $Q_2$ is returned to reference potential through a resistor 33 while its collector is connected to B+ through the resistive portion of an adjustable resistor 34. The movable tap of resistor 34 is coupled through a capacitor 35 to the base of a second transistor $Q_3$, which device serves as a signal matrixing or combining means.

Channel 14 further comprises a second signal translating path which is also coupled to the output of detector 13. This path includes an integrating network formed by a resistor 37 and a capacitor 38 which are serially connected between the emitter of $Q_1$ and reference potential. The junction of resistor 37 and capacitor 38 is connected to the base of transistor $Q_3$ by a resistor 39. As will be shown, resistor 39 together with capacitor 35 and control 34 comprise an adjustable filter circuit. For reasons subsequently to be made clear it is preferred that the time constant of resistor 37 and capacitor 38 be of the same order of magnitude as the time constant of resistor 39 and capacitor 35. The collector of $Q_3$ is connected to B+ via a load resistor 40 and also to the input of second video amplifier 15. The emitter of transistor $Q_3$ is returned to reference potential through a peaking circuit comprising the parallel combination of a capacitor 41 and a resistor 42 which, desirably, have a time constant greater than the time constant of integrator 37, 38. In the filter arrangement 34, 35, 39 which intercouples the two signal translating paths of channel 14, resistor 34 functions as an adjustable picture peaking control by virtue of its role in selecting portions of the signals translated by the differentiating and integrating signal paths for matrixing in the input circuit of transistor $Q_3$, which transistor, in turn, derives a resultant output signal in its collector circuit.

Turning now to a consideration of chrominance channel 20, this stage comprises a tuned input circuit which includes a pair of capacitors 45, 46, a fixed resistor 47 and an adjustable resistor 48, all of which components are serially connected between the emitter of video amplifier $Q_1$ and reference potential. A tapped inductor 49 is connected between the junction of capacitors 45, 46 and reference potential. This input circuit is tuned to resonate near the upper color sideband in order to compensate for IF tilt.

Inductor 49 has an output terminal connected to a band elimination filter $F_1$ comprising the parallel arrangement of an inductor 50, a capacitor 51 and a resistor 52 tunable to the frequency of the color subcarrier. The output of filter $F_1$ is connected to a second band elimination filter $F_2$ which serves to reject unwanted signals in the sideband of the chroma signal. Filter $F_2$ is formed of the parallel arrangement of a tunable inductor 53, a capacitor 54 and a resistor 55. The output of filter $F_2$ is developed across a resistor 56 and applied through a capacitor 57 to a chroma amplifier and demodulation channel 58 which derives three color signals for application to control grids 21 of color tube 17.

Figure 2:
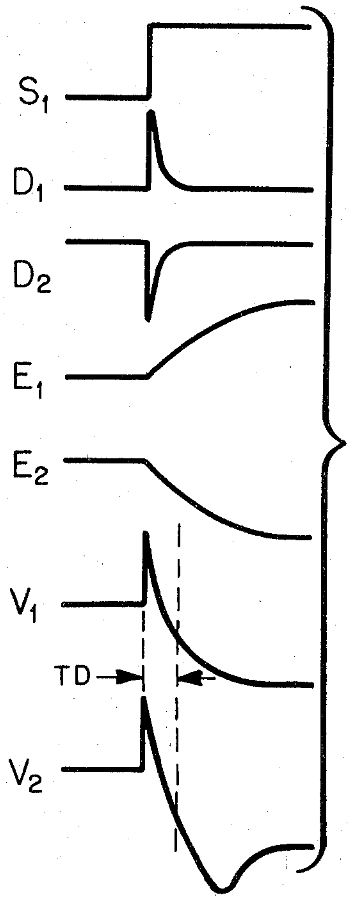
FIG. 2 is a series of waveforms helpful in an understanding of the operation of the luminance channel in FIG. 1.

Prior to detailing the operation of luminance channel 14 it would be helpful to consider, in general, the transient and time delay characteristics of the differentiating and integrating signal paths in response to a step input signal $S_1$. Accordingly, and as illustrated in FIG. 2, pulse $D_1$ depicts the response of the differentiating network to input signal $S_1$, which response is developed across resistor 31 and constitutes the preshoot portion of the resultant signal to be derived. $D_2$ is the phase inverted replica of $D_1$ that appears at the collector of $Q_2$. $E_1$ represents the waveform developed by the integrating network and appearing across capacitor 38 while $E_2$ is the phase inverted form of that signal as it would appear in the collector circuit of $Q_3$. $V_1$ designates the resultant output signal which is derived in the collector circuit of $Q_3$ and $V_2$ is a modification of the resultant output signal having a pronounced degree of peaking or overshoot. Finally, the symbol TD designates the time delay or transit time of a signal through channel 14 and, as graphically depicted, is a measure of the time required for the output signal $V_1$ or $V_2$ to reach its 50 percent gain point.

Now, if the differentiating network 30, 31 has a substantially smaller time constant than integrating network 37, 38, the time delay applied to a signal translated by channel 14 will depend, essentially, on the time constant of the integrating network. In this manner time delay can be specified by the circuit designer and it will remain relatively unaffected by the degree of intercoupling between the networks occasioned by adjustment of peaking control 34. The maximum time delay that can be obtained with a single preshoot overshoot section of the type herein considered is determined by the width of the preshoot and the maximum rise time that can be tolerated for the integrating network. Preferably, the time constant of the differentiating network is selected to produce a pulse having a width sufficient to provide the desired amount of preshoot. The integrating time constant is then selected to give the maximum permissible rise time consonant with an acceptable degree of overshoot. However, it must be remembered that increasing time constant of the integrating network also broadens overshoot and thus deteriorates picture crispening. In practice, therefore the broadness of overshoot that can be tolerated is also a factor in selecting the maximum integrating circuit time constant.

Figure 3B:
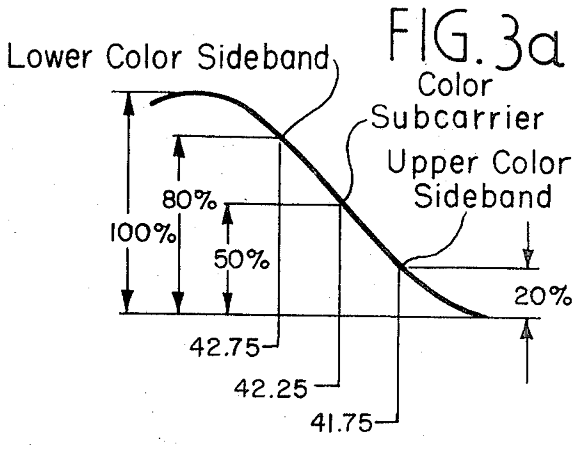
Figure 3B:
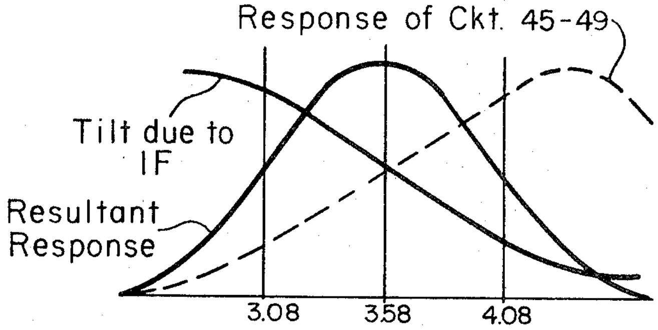
Figure 3C:
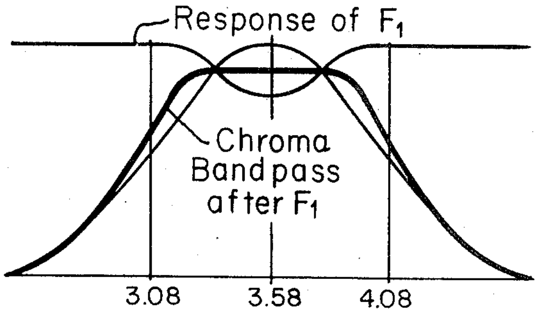

Attention is now directed to some of the characteristics of a color television chroma channel a review of which would also be helpful in an understanding of the invention. In color television receivers it is a practice to design the signal processing circuits so that the chroma signal appears on the slope of the IF bandpass with the chroma subcarrier 6 db. down, see FIG. 3*a*. Including its upper and lower sidebands, the chroma signal occupies approximately 1 MHz. of spectrum along this slope. In order to compensate for this slope, or tilt, it is common practice to utilize an adjustable tuned circuit that resonates near the upper color sideband. While this does correct for tilt, the resulting chroma signal, as shown in FIG. 3*b*, is rather sharply peaked. In order to obtain a flatter chroma passband and better skirt selectivity, it is known to utilize double tuned bandpass circuits in cascade with the tilt correction circuit. However, the use of double tuned bandpass circuits produces excessive time delay in the chroma channel. It is proposed therefore to employ the band elimination or "notch" filter $F_1$, which has substantially less time delay than the conventional double tuned circuit, to flatten the peaked portion of the response, as shown in FIG. 3*c*, and to use filter $F_2$ to improve skirt selectivity.

The operation of luminance signal translating channel 14 is best understood by studying the response of the differentiating and integrating signal paths to a step input signal. Assuming then that the output of video amplifier $Q_1$ is the positive step signal $S_1$, this signal is differentiated by capacitor 30 working into the parallel combination of resistors 31, 32 to develop a modified version of $S_1$ in which the high frequency components are accentuated, specifically, the positive pulse $D_1$ which is applied to the base of $Q_2$. It is this pulse which ultimately comprises the preshoot portion of the output signal of video channel 14. In order to derive an output signal from channel 14 having a finite time delay relative to the signal applied to its input, it is necessary to phase invert either the differentiated signal $D_1$ or the integrated signal $E_1$, relative to the other, prior to combining them to form the output signal. For purposes of illustration signal $D_1$ is selected, although it should be appreciated that the particular one of signals $D_1$, $E_1$ that is inverted is but a matter of choice. To this end $D_1$ is phase inverted by transistor $Q_2$, so that an out-of-phase replica $D_2$ appears in the collector circuit of $Q_2$, that is, across the resistive portion of control 34.

As earlier noted, it is preferable that the time constant of the resistor 37 and capacitor 38 be of the same order of magnitude as the time constant of resistor 39 and capacitor 35. With the time constant parameters thus related, the inverted signal $D_2$ developed at the collector of $Q_2$ is coupled from the tap on control 34 via capacitors 35, 38 and applied across resistor 39 so that signal $D_2$ appears at the base of transistor $Q_3$ for matrixing with a signal to be developed by the integrating network 37, 38. The magnitude of differentiated signal $D_2$ appearing at the base of $Q_3$ depends upon the setting of the picture peaking control 34. For example, setting the tap on control 34 to the terminal connected to the collector of $Q_2$ applies the maximum amplitude of signal $D_2$ to the base of $Q_3$, which, in turn, produces maximum preshoot in the output of video channel 14. Conversely, positioning the tap to the opposite terminal of control 34 effectively places the tap at AC ground potential so that no differentiated pulse is applied to $Q_3$ and, therefore, minimum preshoot condition obtains.

Turning now to consideration of the integrating signal path, the application of the step input signal $S_1$ to network 37, 38 produces waveform $E_1$ at the juncture of resistor 37 and capacitor 38, which signal is applied through resistor 39 to the base of transistor $Q_3$. In the absence of a pulse signal from the differentiating network, a phase inverted replica $E_2$ of the integrated signal would be developed across the collector load resistor 40. Since the time constant of peaking circuit 41, 42 is greater than the time constant of integrator 37, 38 transistor $Q_3$ has less degeneration in the upper frequency region of the band passed by the integrating network because of the shunting effect of capacitor 41. Therefore, the high frequency components of the integrated signal $E_1$ applied to the base of $Q_3$ will be emphasized or peaked so that its replica in the collector circuit will display an overshoot. Viewed in another way, resistor 42 is a degenerative feedback resistor for the low frequency components of signal $E_1$.

Transistor $Q_3$ and peak picture control 34, which converts filter 39, 35 to an adjustable filter stage, comprise means for matrixing or combining selectable portions of phase inverted signal $D_2$ and signal $E_1$ to produce resultant signal $V_1$ or $V_2$. More particularly, when control 34 is set for maximum peaking, the entire resistive portion of the control is inserted in series with capacitor 35 so that filter 35, 39 has minimal effect upon the high frequency components of integrated signal $E_1$. As a result the high frequency content of the integrated signal $E_1$ is preserved for emphasis by the emitter peaking circuit 41, 42 of $Q_3$ and a resultant signal $V_2$ having maximum overshoot is produced. Moreover, this same setting of control 34 provides maximum preshoot since the full amplitude of pulse $D_2$ is applied to the base of $Q_2$ by capacitor 35.

On the other hand, when control 34 is adjusted for minimum peaking capacitor 35 is effectively grounded, for signal frequencies, through the B+ power supply and signal $E_1$ is subjected to the full filtering effect of resistor 39 and capacitor 35. In this situation the high frequency components of signal $E_1$, which would have been emphasized by emitter peaking in amplifier $Q_3$ are filtered out before signal $E_1$ is applied to the base of amplifier $Q_3$. Since this setting of control 34 also places capacitor 35 at the low AC potential terminal of the $Q_2$ collector load impedance substantially no differentiated pulse from $Q_2$ is available for $Q_3$. Therefore, an output signal, similar to waveform $E_2$ and devoid of preshoot and overshoot, is derived when control 34 is positioned for minimum peaking. In either event, the resultant video signal derived in the output of $Q_3$ will, for the circuit values given below, have a time delay, relative to the input signal applied to the differentiating and integrating networks, of approximately 350 nanoseconds.

Control 34 and filter 35, 39 are thus seen to constitute an extremely versatile arrangement for simultaneously selecting the degree of preshoot and overshoot to be applied to a video signal. By altering the high frequency response of the signal in this fashion the transition in picture elements from light to dark scenes, as well as from dark to light, is readily selectable by the viewer to satisfy his particular taste or requirements, an attractive feature for color or monochrome receivers. Additionally the approximately 350 nanosecond time delay introduced by channel 14 permits, with the disclosed arrangement for chroma channel 20, elimination of the conventional delay line thus effecting a significant economy in the color receiver. On the other hand, insofar as monochrome reception is concerned, the time delay occasioned by the circuitry of channel 14 in no way disturbs reception of such telecasts. Finally, in either application, i.e., color or monochrome, the disclosed signal translating circuit for modifying the high frequency response of a video signal is readily amenable to integrated circuit fabrication in that only resistors, capacitors and transistor devices are employed.

Insofar as the operation of chroma channel 20 is concerned, the chroma component of the composite output signal from detector 13 is derived by circuit 45–49 coupled to the emitter of transistor $Q_1$. Input circuit 45–49, which is tuned to resonate near the upper color sideband of the color signal, serves to compensate for the IF tilt in the manner shown in FIG. 3*b*. Although the response of the color signal is now more or less symmetrical about the 3.58 MHz. subcarrier, the sideband response is undesirably attenuated relative to midband response. To remedy this situation band elimination filter $F_1$ is tuned to 3.58 MHz. in order to flatten the peak or nose of the response curve as shown in FIG. 3*c*.

The additional notch filter $F_2$ is employed to reject unwanted signals in the sideband of the chroma response. In the disclosed embodiment filter $F_2$ is tuned to resonate at 2.50 MHz. thereby rejecting single sideband chrominance components falling between 2 and 3 MHz. If desired, an additional notch filter can be employed to reject undesired signals falling above the chroma passband, in particular the 4.5 MHz. sound carrier. In any event, in an actual embodiment of the invention a pair of band elimination filters $F_1$, $F_2$ have been used in place of the conventional double tuned filters to achieve a desired color signal response with but a fraction of the time delay inherent in double tuned filters. Utilizing input circuit 45–49 and a pair of notch filters $F_1$, $F_2$ having the component values given below, the time delay of the entire chroma channel has been reduced to about 400 nanoseconds. Since, as previously noted, luminance channel 14 has been determined to exhibit approximately 350 nanoseconds time delay, it is apparent that the use of the disclosed luminance channel together with a chrominance channel having notch filters permits elimination of the conventional delay line utilized in color television receivers.

Insofar as skirt selectivity is concerned, if it is determined that one notch filter is inadequate, additional filters can be added at appropriate frequencies outside the color band to eliminate troublesome signals such as the 4.5 MHz. sound or the 2 to 3 MHz. single sideband chroma components without introducing appreciable time delay in the chroma passband. Although filters $F_1$ and $F_2$ are disclosed as utilizing inductors 50 and 53, band elimination filters utilizing only resistors and capacitors can be substituted for the filter circuits shown. A particular advantage residing in the use of resistance-capacitance filters in the chroma channel is that such filters are readily amenable to integrated circuit fabrication.

Several circuits for luminance and chrominance channels of the types shown in FIG. 1 have been designed and have been determined to give very satisfactory performance. By way of illustration, but in no sense by way of limitation, the circuit parameters for representative luminance and chrominance channels of the type shown in FIG. 1 are as follows:

| | |
|---|---|
| B+ | 24 v. |
| transistor $Q_1$ | Type 2N3708 |
| transistor $Q_2$ | Type 2N3708 |
| transistor $Q_3$ | Type 2N3708 |
| capacitor 30 | 12 pf. |
| resistor 18 | 1.5 kilohms |
| resistor 31 | 1.5 kilohms |
| resistor 32 | 3.3 kilohms |
| resistor 33 | 0.47 kilohms |
| potentiometer 34 | 1.0 kilohms |
| capacitor 35 | 82 pf. |
| resistor 37 | 0.22 kilohms |
| capacitor 38 | 330 pf. |
| resistor 39 | 1.0 kilohms |
| resistor 40 | 1.0 kilohms |
| capacitor 41 | 390 pf. |
| resistor 42 | 0.33 kilohms |
| capacitor 45 | 47 pf. |
| capacitor 46 | 47 pf. |
| resistor 47 | 0.47 kilohms |
| resistor 48 | 25.0 kilohms |
| inductor 49 | 25.0 μh. |
| inductor 50 | 3.0 μh. |
| capacitor 51 | 680.0 pf. |
| resistor 52 | 0.33 kilohms |
| inductor 53 | 13.0 μh. |
| capacitor 54 | 330.0 pf. |
| resistor 55 | 1.0 kilohms |
| resistor 56 | 0.47 kilohms |
| capacitor 57 | 39.0 pf. |

DESCRIPTION OF AN ALTERNATE EMBODIMENT

An alternate embodiment of the invention comprising a single transistor video signal translating channel 14' is shown in FIG. 2. More particularly, channel 14' comprises a source $Q_1'$ of detected luminance signal which is coupled to a transistor $Q_4$ through a pair of signal translating paths. A first signal path comprising a differentiating network includes a pair of capacitors 60, 61 which are serially connected between the output of detector $Q_1'$ and reference potential. The juncture of capacitors 60, 61 is connected to the adjustable tap of a variable resistor 62. The resistance portion of control 62 serves to connect the emitter of transistor $Q_4$ to reference potential. The differentiating network is formed by capacitors 60, 61 and the resistance seen looking into the tap of the control.

A second signal translating path comprises an integrating network that includes a resistor 64 and a capacitor 65. The output of integrator 64, 65 is coupled by the resistor 66 to the base of transistor $Q_4$. The collector of $Q_4$ is connected to a source of positive potential through a load resistor 67 across which an output signal is developed.

Figure 4:
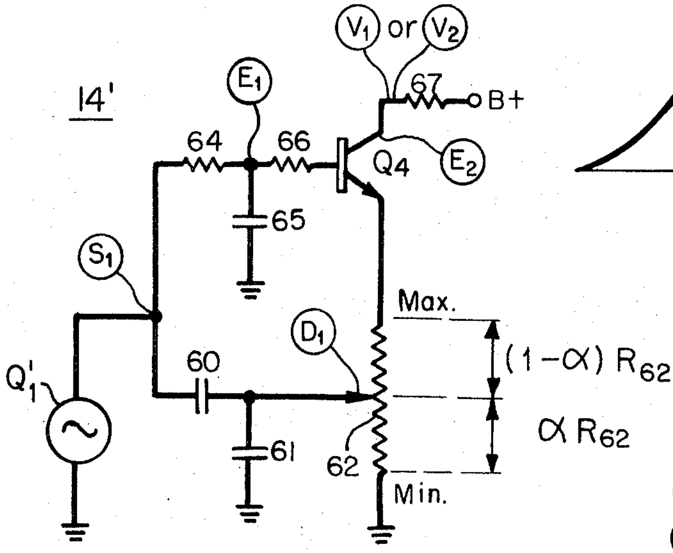
FIG. 4 is a schematic diagram illustrating an alternative embodiment of a luminance channel for use in the television receiver of FIG. 1.

Insofar as the operation of the signal translating circuit of FIG. 4 is concerned, the application of an input signal $S_1$ to the differentiating network produces a positive pulse $D_1$ at the tap on control 62. A selectable portion of the high frequency content of the input signal is applied to the emitter of $Q_4$ by the circuit comprised of capacitors 60, 61 and control 62. The amount of resistance seen by the signal at the tap affects the width of pulse $D_1$, the higher the resistance, the wider the pulse. This resistance, designated $R_{eq}$ is the equivalent resistance of the circuit beyond the tap point and, in addition to control 62 and resistor 66, takes into consideration the input resistance of transistor $Q_4$ as well as its beta. The width of pulse $D_1$, therefore, is determined by capacitors $C_{60}$, $C_{61}$ and the equivalent resistance $R_{eq}$ presented to the pulse at the tap of control 62. Insofar as $R_{eq}$ is concerned, care must be exercised in the design of the circuit to limit the maximum $R_{eq}$ to such a value that preshoot does not become objectionably wide since, as previously noted, this would deteriorate crispening.

The resistance exhibited by control 62 can be separated into two components, namely $\alpha R_{62}$ and $(1-\alpha)R_{62}$, where $\alpha$ has a value less than 1. As is evident from FIG. 4, $\alpha R_{62}$ represents the value of resistance between the tap and the grounded terminal of the control, while $(1-\alpha)R_{62}$ designates the value of resistance between the tap point and the terminal connected to the emitter of $Q_4$. Note that $(1-\alpha)R_{62}$, which is serially inserted between the control tap and the emitter of $Q_4$, does vary with control adjustment. As a result, the current pulse developed in the emitter will have a peak amplitude that is a function of $(1-\alpha)R_{62}$. Accordingly, adjustment of the control tap causes substantial variations in the peak amplitude of the emitter preshoot current pulse with the maximum amplitude of the emitter pulse current occuring when $\alpha$ is equal to 1, that is, when the tap is positioned to the emitter terminal of control 62.

On the other hand, if $\alpha$ is permitted to go to zero, that is, with control tap positioned to reference potential, there will be no preshoot emitter current pulse developed. Resistor 66, which is included in the base circuit of $Q_4$, insures that the impedance seen looking into the emitter of transistor $Q_4$ does not become so low as to severely load transistor amplifier $Q_1'$ driving the differentiating network. If desired a current limiting resistor could also be inserted between the lower terminal of control 62 and reference potential. In any event, when the tap of control 62 is so positioned within its operating range that $\alpha$ is greater than zero, in the absence of an integrated signal, a pulse $D_1$ is applied to the emitter of transistor $Q_4$ and an inphase replica of $D_1$ is developed in the collector circuit of $Q_4$.

The output signal $E_1$ of integrator 64, 65 is fed through resistor 66 to the base of transistor $Q_4$ so that an out-of-phase replica $E_2$ is developed in the collector circuit. By virtue of the matrixing action of transistor $Q_4$ a resultant output signal $V_1$ is developed across collector resistor 67. To a signal applied to the base of $Q_4$, this transistor appears as an emitter peaked amplifier with capacitors 60, 61 shunting $\alpha R_{62}$. As a result, the high frequency components of the integrated waveform applied to the base of $Q_4$ are subjected to less emitter degeneration than the low frequency components. Moreover, as $\alpha$ approaches unity, $(1-\alpha)R_{62}$ approaches zero and the maximum preshoot pulse $D_1$ is fed to $Q_4$. At the same time the integrated waveform $E_1$ at the base of $Q_4$ sees maximum emitter peaking, that is, capacitors 60, 61 now completely shunt the resistive portion of control 62. In this situation a signal $V_2$ having maximum preshoot and overshoot is developed in the collector circuit of $Q_4$.

Conversely, as $\alpha$ decreases the magnitude of emitter current pulse decreases as does the amplitude of pulse $D_1$ at the emitter of $Q_4$ thereby reducing preshoot. Simultaneously, the amount of emitter peaking decreases because the resistance of control 62 in the emitter circuit is now only partially bypassed. Thus, as in the principal embodiment, preshoot and overshoot track, that is, maximum preshoot occurs with maximum overshoot while minimum preshoot is accompanied by minimum overshoot.

Again, by way of illustration but in so sense by way of limitation, circuit parameters for the FIG. 4 embodiment which have been determined to give very satisfactory performance are as follows:

| | |
|---|---|
| B+ | 24 v. |
| transistor $Q_1'$ | Type 2N3708 |
| transistor $Q_4$ | Type 2N3708 |
| capacitor 60 | 1,500 pf. |
| capacitor 61 | 330 pf. |
| potentiometer 62 | 100 ohms |
| resistor 64 | 100 ohms |
| capacitor 65 | 1,000 pf. |
| resistor 66 | 470 ohms |
| resistor 67 | 1,000 ohms |

The single transistor embodiment of FIG. 4, employing the components set forth above serves to introduce a finite time delay approximating 350 nanoseconds to signals translated by channel 14′. Moreover, by virtue of adjustable control 62 in the emitter circuit of transistor $Q_4$, the degrees of preshoot and overshoot imparted to the translated signal are simultaneously controllable.

In each of the embodiments of the invention, there is disclosed video signal translating circuit having a pair of signal translating paths, one of which serves to develop a differentiated waveform while the other derives an integrated waveform. Depending upon the magnitude of differentiated pulse selected by control 62 the amount of preshoot applied to the luminance signal is controlled while the amount of emitter peaking selected by the control determines overshoot. Moreover, in each embodiment a single control is employed to select the degree of preshoot and overshoot applied to the luminance signal thus providing the viewer with convenient means for adjusting the definition of the reproduced image.

The invention finds ready application in a color television receiver wherein it is desired to introduce a finite amount time delay to the luminance signal in order that it may arrive in time coincidence with the chrominance signal at the cathode-ray tube control electrode. On the other hand, insofar as monochrome receivers are concerned, the invention finds particular utility as an adjustable picture crispening control in that the degree of crispening or definition can be selected by the viewed since the degree of preshoot and overshoot introduced to the video signal determines the sharpness of transition from white area scene to black area scene and vice versa.

While particular embodiments of the invention have been described, it is obvious to those skilled in the art that changes and modifications may be made without departing from the invention in its broader aspects, and therefore, it is intended in the appended claims to cover all such modifications and changes as they fall within the true spirit and scope of the invention.

We claim:

1. A signal translating channel for a television signal receiver having a detector for developing a video signal, said channel essentially consisting of:

a first signal translating path coupled to the output of said detector and including a differentiating network for developing a modified version of said detected video signal in which the high frequency components are accentuated;

a second signal translating path coupled to the output of said detector through a direct connection and including an integrating network for developing a differently modified version of said detected video signal in which the high frequency components are attenuated;

and means for phase inverting one of said modified signals relative to the other and for matrixing said phase inverted signal and the other of said modified signals to produce a resultant video signal having an altered frequency response.

2. A signal translating channel as set forth in claim 1 in which said means includes an adjustable control circuit for selecting portions of said phase inverted signal and said other modified signal.

3. A signal translating channel as set forth in claim 1 in which said means comprises a first transistor for phase inverting said one of said modified signals and a second transistor having an input circuit for combining said phase inverted signal and said other of said modified signals.

4. A signal translating channel as set forth in claim 3 in which said differentiating network has an output terminal coupled to the input of said first transistor and in which said integrating network and said first transistor have respective output terminals coupled to said input circuit of said second transistor.

5. A signal translating channel as set forth in claim 4 in which a variable resistor is coupled between said output electrode of said first transistor and said input circuit of said second transistor.

6. A signal translating channel as set forth in claim 4 in which said second transistor includes an emitter peaking circuit for emphasizing the high frequency components of said signal developed by said integrating network.

7. A signal translating channel as set forth in claim 1 in which said means for phase inverting and matrixing comprises a single transistor device.

8. A signal translating channel as set forth in claim 7 in which said first signal translating path is coupled to the emitter of said transistor and said second signal translating path is coupled to the base of said transistor.

9. A signal translating channel as set forth in claim 1 in which said differentiating and integrating networks are formed of resistive and capacitive components only.

10. A signal translating channel as set forth in claim 2 in which said differentiating network develops a pulse signal of predetermined polarity, Said integrating network develops an integrated signal of like-polarity, and said phase inverting and matrixing means inverts the phase of said pulse signal and further includes a peaking network for emphasizing the high frequency content of said integrated signal so that said resultant video signal produced by said means comprises a preshoot portion formed by said pulse signal and an overshoot portion formed by the emphasized high frequency content of said integrated signal.

11. A signal translating channel as set forth in claim 10 in which said adjustable control circuit comprises a high pass filter and a variable resistor which, upon actuation, simultaneously varies the amplitude of said pulse signal and the high frequency content of said integrated signal thereby controlling the degree of preshoot and overshoot applied to said means.

12. A color television receiver comprising:

a video detector for developing a chrominance signal and a luminance signal;

a chrominance channel for processing said chrominance signal comprising a plurality of band elimination filters, said chrominance channel introducing a predetermined time delay in the processing of said chrominance signal;

a luminance channel comprising a first signal translating path coupled to the output of said video detector and including a differentiating network for developing a modified version of said detected luminance signal, a second signal translating path also coupled to the output of said video detector and including an integrating network for developing a differentially modified version of said detected luminance signal delayed in time relative to said detected luminance signal, means for phase inverting one of said modified signals relative to the other, and matrix means coupled to both said signal paths for combining said phase inverted signal and the other of said modified signals to produce a resultant luminance signal having a finite time delay approximating said predetermined time delay of said chrominance channel thereby establishing said luminance and chrominance signals in substantial time coincidence.

* * * * *